United States Patent
Warhurst et al.

[11] Patent Number: 6,071,062
[45] Date of Patent: Jun. 6, 2000

[54] APPARATUS FOR LIFTING, HANDLING, AND TRANSPORTING A CONTAINER

[75] Inventors: Peter S. Warhurst; William R. Courtney, both of Belleair; David Revelia, New Port Richey, all of Fla.

[73] Assignee: PODS, Inc., Clearwater, Fla.

[21] Appl. No.: 09/108,980

[22] Filed: Jul. 1, 1998

[51] Int. Cl.[7] ...................................................... B60P 1/64
[52] U.S. Cl. ........................ 414/498; 414/347; 414/458
[58] Field of Search ................................... 414/340, 341, 414/347, 458, 459, 460, 461, 498, 500, 501, 522, 495

[56] References Cited

U.S. PATENT DOCUMENTS

| | | | |
|---|---|---|---|
| 2,197,375 | 4/1940 | Dafnis | 104/48 |
| 2,703,659 | 3/1955 | Hutchins | 414/498 |
| 2,937,879 | 5/1960 | Lion | 280/13.21 |
| 3,135,407 | 6/1964 | Back | 414/498 |
| 3,243,193 | 3/1966 | Fulmer et al. | 280/35 |
| 3,541,598 | 11/1970 | Dousset | 214/392 |
| 3,744,652 | 7/1973 | Rieschel | 414/459 |
| 3,881,689 | 5/1975 | Bury et al. | 254/45 |
| 4,297,068 | 10/1981 | Concha et al. | 414/458 |
| 4,491,452 | 1/1985 | Matovich | 414/458 |
| 4,522,550 | 6/1985 | Whitehouse | 414/498 |
| 4,712,966 | 12/1987 | Gross | 414/458 |
| 4,765,594 | 8/1988 | Riedl et al. | 254/45 |
| 4,897,011 | 1/1990 | Brower | 414/459 |
| 5,006,031 | 4/1991 | Fossing et al. | 414/458 |
| 5,417,540 | 5/1995 | Cox | 414/498 |
| 5,800,114 | 9/1998 | Secondi | 414/498 |

*Primary Examiner*—Dean J. Kramer
*Attorney, Agent, or Firm*—Dennis G. LaPointe; Mason & Assoc., P.A.

[57] ABSTRACT

A hydraulically actuated mobile carrier frame wraps around a storage container of standard size and lifts the container from the ground onto a transport vehicle. The carrier frame subsequently returns the container to the ground. The carrier frame stays with the vehicle. The carrier frame can be expanded transversely to clear the vehicle for loading and unloading, then contracted into notches in the vehicle platform to be releasably locked to the vehicle for over the road transport.

39 Claims, 8 Drawing Sheets

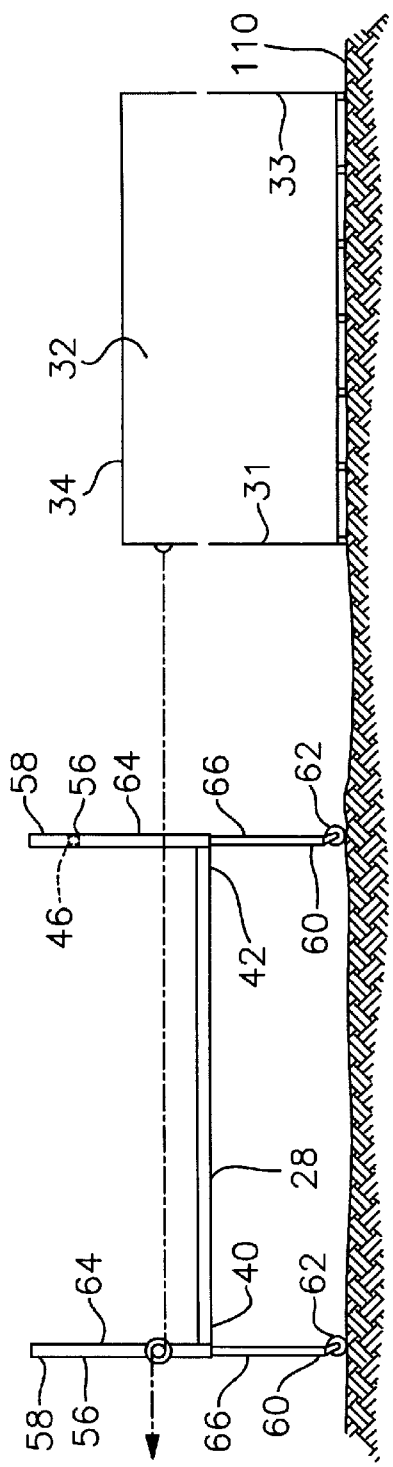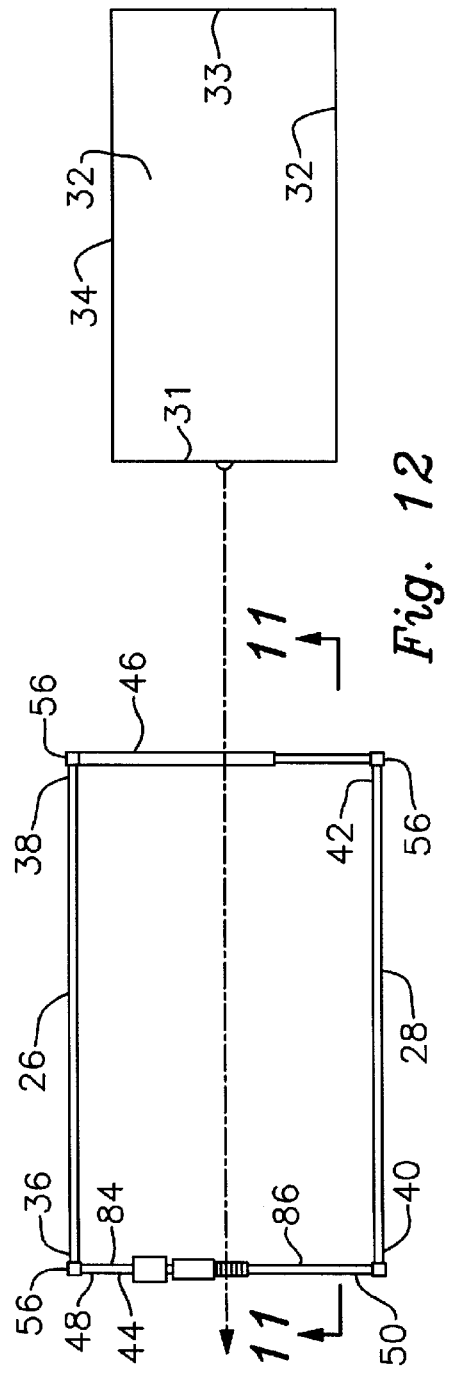

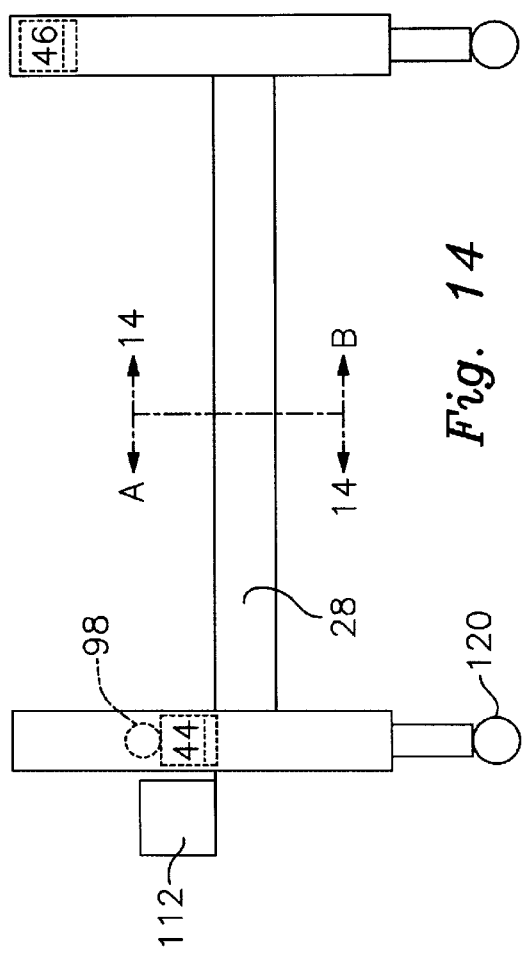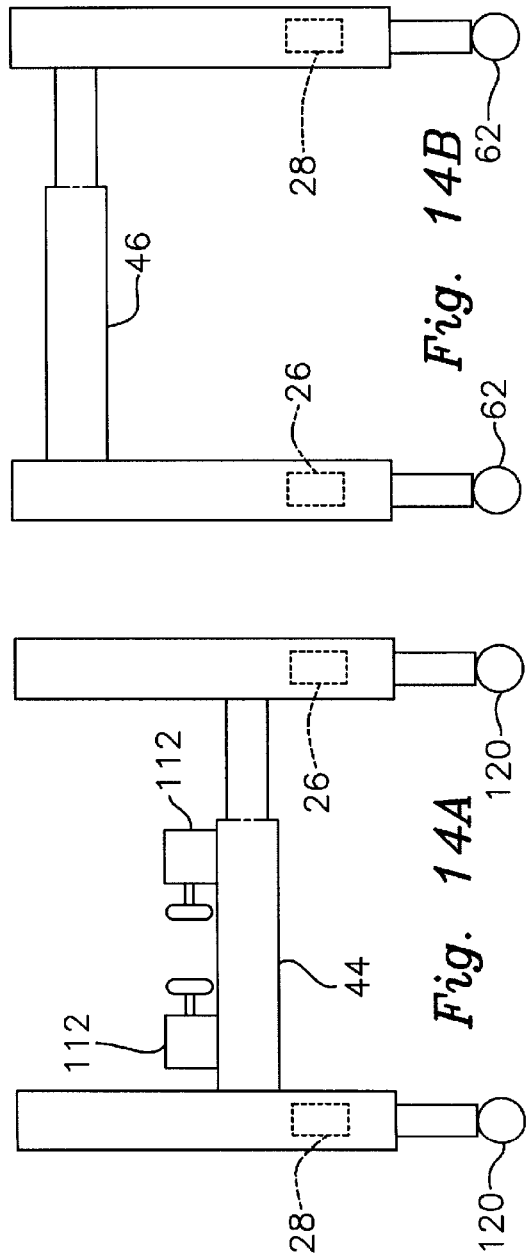

APPARATUS FOR LIFTING, HANDLING, AND TRANSPORTING A CONTAINER

FIELD OF THE INVENTION

The present invention relates generally to the field of storage containers, and pertains, more specifically, to a method and apparatus for lifting and handling a storage container, loading it onto a road vehicle, transporting it to a given location, and unloading the container from the vehicle.

BACKGROUND OF THE INVENTION

Industry often has requirements to lift and transport containers. Many freight yards and ocean shipping docks use cranes of various types with lifting cables that attach to the corner brackets that are found on most shipping containers. Methods and apparatus for lifting and transporting containers are known and, heretofore, have been configured in different ways. Some examples of container handling systems in the prior art are seen in the following U.S. patents:

Dousset, U.S. Pat. No. 3,541,598, shows two end-fitted structures, called portals, which are wheeled and have hydraulic jacks. They are attached at upper and lower corners of the container. There are no longitudinal frame elements, only transverse ones. The container thus serves as a structural frame, and must be strong enough to support typically up to 15,000 pounds of cargo. There is no method or apparatus for moving and positioning the portals from the vehicle to the container, and back. This is apparently done by hand, a difficult and dangerous task. There is no structure to quickly and safely lock the portals onto the vehicle for transport, with or without the container.

Fossing, U.S. Pat. No. 5,006,031, also uses two structures, but they are connected together after lifting. The two-wheeled sections, with hydraulic jacks, are attached to the longitudinal sides of the container, not the ends. Cross pieces are connected beneath the container. The attachment brackets have an H-shape.

Bury, U.S. Pat. No. 3,881,689, discloses a four-sided frame for lifting camper bodies. It is U-shaped to fit around the body and has a cross bar fitted across the open end. The jacks are mechanical, and raise the container with respect to the frame. There is no method or apparatus for moving and positioning the frame from the vehicle to the body, and back. The camper body cannot be lowered to the ground. The frame must be dismantled by hand and stored or carried on the vehicle.

Dafnis, U.S. Pat. No. 2,197,375, illustrates a wheeled lifter and transporter for railroad cars. The frame is disposed over the top of the container, not around it. Hydraulic jacks fit below projecting brackets on the car, raising the car with respect to the frame. There is no transport vehicle.

Lion, U.S. Pat. No. 2,937,879, shows a container with built-in hydraulic jacks with wheels, at each corner. The container structure serves as a frame. There is no transport vehicle.

Fulmer, U.S. Pat. No. 3,243,193, discloses an attachable running gear to be fitted to the ends of a container. It consists of a pair of brackets and wheels. The brackets are attached to the ends of the container, then connected together underneath. Hydraulic jacks raise the container.

Concha, U.S. Pat. No. 4,297,068, also discloses an attachable running gear to be fitted to the ends of a container. It consists of a pair of brackets and wheels, with hydraulic jacks.

Gross, U.S. Pat. No. 4,712,966, illustrates a liftable and transportable rack for stackable cargo. There is no closed container or box-like structure. A pair of wheeled brackets with hydraulic jacks fit into the rack ends.

Riedl, U.S. Pat. No. 4,765,594, displays four separate wheel and jack assemblies that are attached to the corners of the container. The jacks are rack and pinion type. The assemblies are not interconnected.

Fulmer, Concha, Riedl, and Fossing show no transport vehicle. The wheels mounted to the container form a trailer.

While the above-described inventions serve to lift and move a container, they are awkward to position around the container. They show difficulty in moving the frame and container into position. The prior art devices disclose no way of changing the width of the frame to provide clearance around the vehicle. They have no way of releasably attaching the frame to the vehicle for safe transport.

Accordingly, there is a need to provide a means for easy positioning of the frame around the container, and for moving and positioning the frame and the container together.

There is a further need to provide a method to adjust the width of the frame under power to clear the vehicle and the container when moving and positioning the frame.

There is a yet further need to provide a means for releasably attaching the frame to the vehicle for safe transport.

SUMMARY OF THE INVENTION

The present invention is a hydraulically actuated mobile carrier frame which wraps around a storage container of standard size and lifts the container from the ground onto a transport vehicle, and subsequently back to the ground. Containers are typically 8 feet wide by 8 feet high by 16 feet long, and weigh up to 15,000 lbs. The carrier frame is not a permanent part of the vehicle, but is normally stored on the vehicle. The actuators of the present invention are actuated by gasoline engine driven hydraulic pumps mounted on the carrier frame. The carrier frame has swivel wheel assemblies incorporating hydraulic motors and a chain and sprocket drive arrangement installed to the lower end of the front upright members for providing a self-propelled and steerable carrier frame.

The above features, as well as further features and advantages, are attained by the present invention which may be described briefly as an apparatus for lifting and transporting a container having right and left sides and front and rear ends, the apparatus comprising: a carrier frame having right and left longitudinal elements juxtaposed with the right and left sides, respectively, of the container, each longitudinal element extending between opposite first and second ends, the carrier frame having front and rear transverse elements juxtaposed with the front and rear ends, respectively, of the container, each transverse element extending between opposite right and left ends, the left ends of the front and rear transverse elements being adjacent to the first and second ends, respectively, of the left longitudinal element, and the right ends of the front and rear elements being adjacent to the first and second ends, respectively, of the right longitudinal element, the carrier frame further including a plurality of generally vertical upright members attached to the carrier frame, each upright member extending between opposite upper and lower ends; bearing means, attached to each upright member lower end, for ground bearing and relative movement of the upright members with the ground; elevating means for elevating and lowering the carrier frame with respect to the ground; a transport vehicle, having a platform suitable for transporting the container and carrier frame simultaneously; steering and mobility means, connected to the carrier frame, for self-propelled mobility and directional movement of the carrier frame; and supporting means, connected to the carrier frame and to the container, for supporting the container by the carrier frame.

BRIEF DESCRIPTION OF THE DRAWING

The invention will be more fully understood, while still further features and advantages will become apparent, in the following detailed description of preferred embodiments thereof illustrated in the accompanying drawing, in which:

FIG. 11 is a side elevational view of the storage container and carrier frame of FIG. 1, showing the carrier frame elevated above the level of the transport vehicle platform with the container resting upon the ground, and the carrier frame separated from the container;

FIG. 12 is a plan view of FIG. 11; and

FIG. 14 is a side elevational view of the carrier frame of FIG. 1, showing the carrier frame with self-contained gasoline engine driven hydraulic pumps and relative height position of the rear transverse element.

FIG. 14A is a sectional elevation view of the carrier frame of FIG. 14 depicting the gasoline engine driven hydraulic pumps.

FIG. 14B is a sectional elevation view of the carrier frame of FIG. 14 depicting the rear transverse element.

DESCRIPTION OF THE PREFERRED EMBODIMENTS

Figure 1:
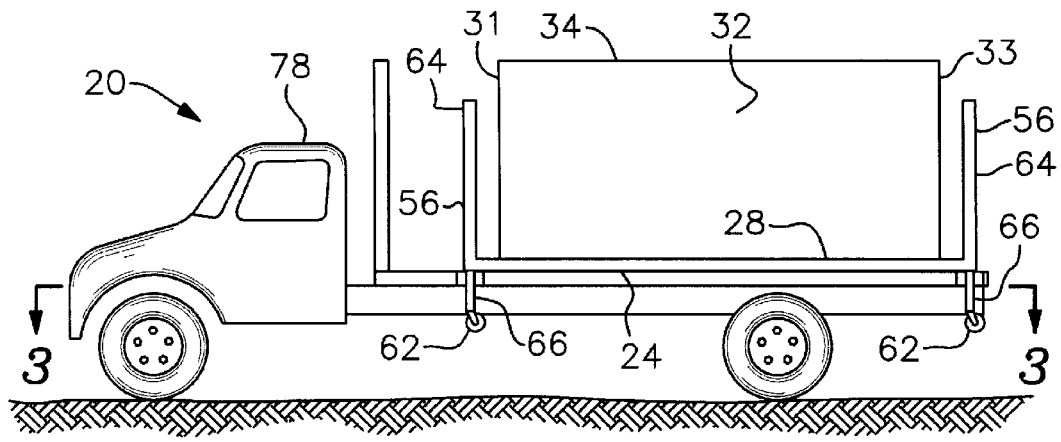
FIG. 1 is a side elevational view of a transport vehicle transporting a storage container and a carrier frame constructed in accordance with the invention.
Figure 2:
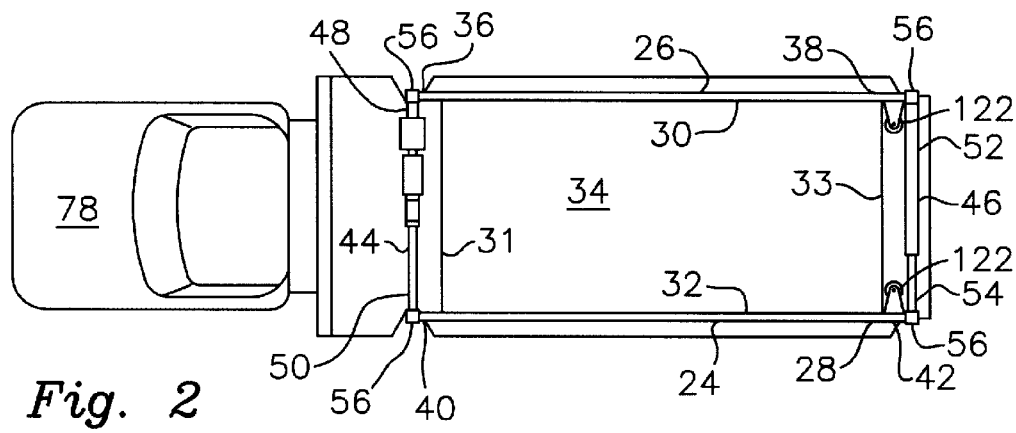
FIG. 2 is a plan view of the transport vehicle, storage container, and carrier frame of FIG. 1.
Figure 3:
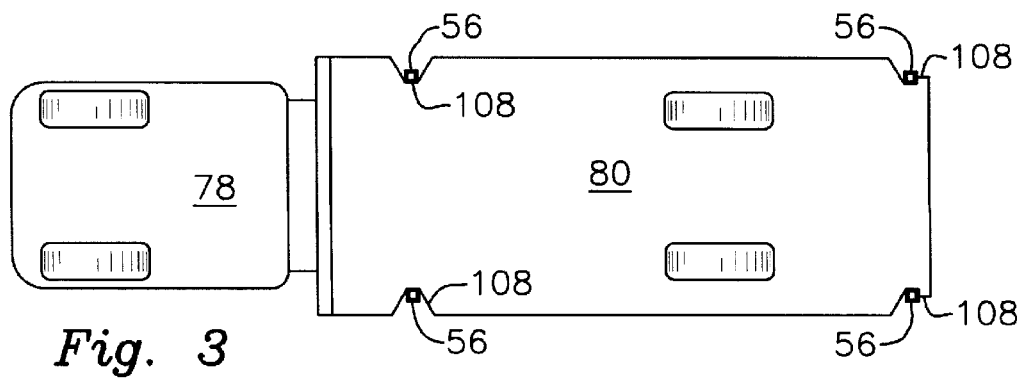
FIG. 3 is a sectional view of the transport vehicle, storage container, and carrier frame of FIG. 1, the section being taken along lines 3—3 of FIG. 1.

Referring now to the drawing, and especially to FIGS. 1,2,4, and 5, an apparatus for lifting and transporting a container 34 having right and left sides, 30 and 32 respectively, and front and rear ends, 31 and 33 respectively, is shown at 20. The apparatus includes a carrier frame 24 having fixed right 26 and left 28 longitudinal elements juxtaposed with the right 30 and left 32 sides, respectively of the container 34. The right longitudinal element 26 extends between opposite first 36, and second 38 ends. The left longitudinal element 28 extends between opposite first 40, and second 42 ends. The carrier frame 24 has front 44 and rear 46 transverse elements juxtaposed with the front 31 and rear 33 ends, respectively, of the container 34. The front transverse element 44 extends between opposite right 48 and left 50 ends. The rear transverse element 46 extends between opposite right 52 and left 54 ends. The left end 50 of the front transverse element 44 is adjacent to the first 40 end of the left longitudinal element 28. The left end 54 of the rear transverse element 46 and the right end 52 of the rear transverse element 46 are fixed to respective upright members 56 at sufficient height to allow the apparatus to be moved over container 34 while extended, then lowered down for attachment of carrier frame 24 to the container 34. The right end 48 of the front transverse element 44 is adjacent to the first end 36 of the right longitudinal element 26.

The carrier frame 24 includes four generally vertical upright members 56 attached to the carrier frame 24, each upright member 56 extending between opposite upper 58 and lower 60 ends. Wheels 62 are attached to each upright member lower end 60, for ground 110 bearing and relative movement of the upright members 56 with the ground 110. The upright members 56 each comprise a tubular fixed element 64 attached to the carrier frame 24 and a tubular sliding element 66 mounted for sliding movement within the fixed element 64.

Elevating means, specifically a plurality of actuators 68, is mounted within the upright members 56, for elevating and lowering the carrier frame 24 with respect to the ground 110. Each actuator 68 has opposite first 70 and second 72 ends. The first end 70 is attached to the upright member fixed element 64. The second end 72 is attached to the upright member sliding element 66. Thus, upon being actuated in an extending direction as shown by arrow 74 in FIG. 13, the actuators 68 will slideably extend the sliding element 66 from within the fixed element 64 in a telescoping manner, so as to elevate the carrier frame 24. Conversely, upon being actuated in a retracting direction as shown by arrow 76 in FIG. 13, the actuators 68 will slideably retract the sliding element 66 into the fixed element 64 in a telescoping manner, so as to lower the carrier frame 24.

A transport vehicle 78, such as a specially modified truck, is provided and has a platform 80 suitable for transporting the container 34 and carrier frame 24 simultaneously.

Figure 15:
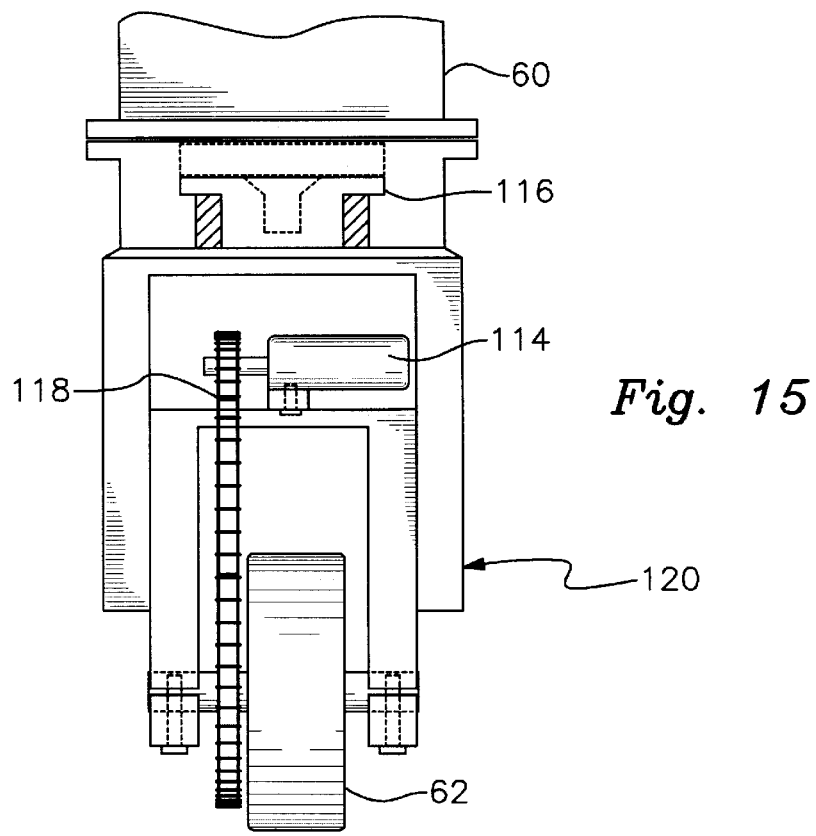
FIG. 15 is a perspective view of the preferred embodiment of the steering and mobility means depicting front swivel wheel assembly including the hydraulic motor and sprocket chain drive.
Figure 4:
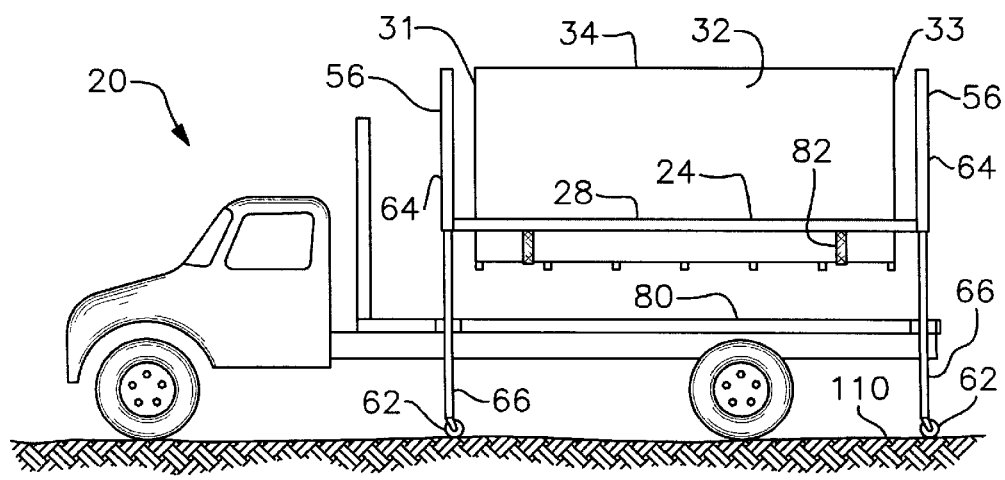
FIG. 4 is a side elevational view of the transport vehicle, storage container, and carrier frame of FIG. 1, showing the upright elements extended to the ground and the carrier frame and container elevated above the transport vehicle platform.
Figure 5:
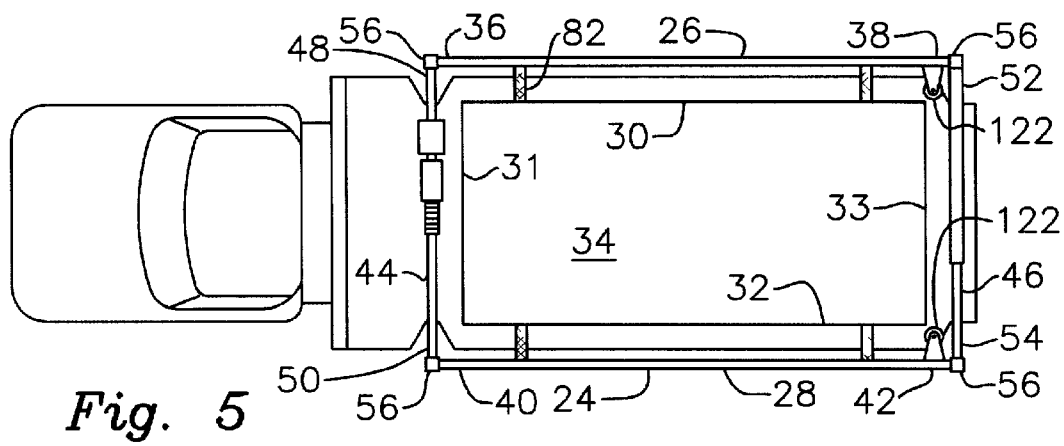
FIG. 5 is a plan view of FIG. 4, showing the transport vehicle, storage container, and carrier frame of FIG. 1.
Figure 6:
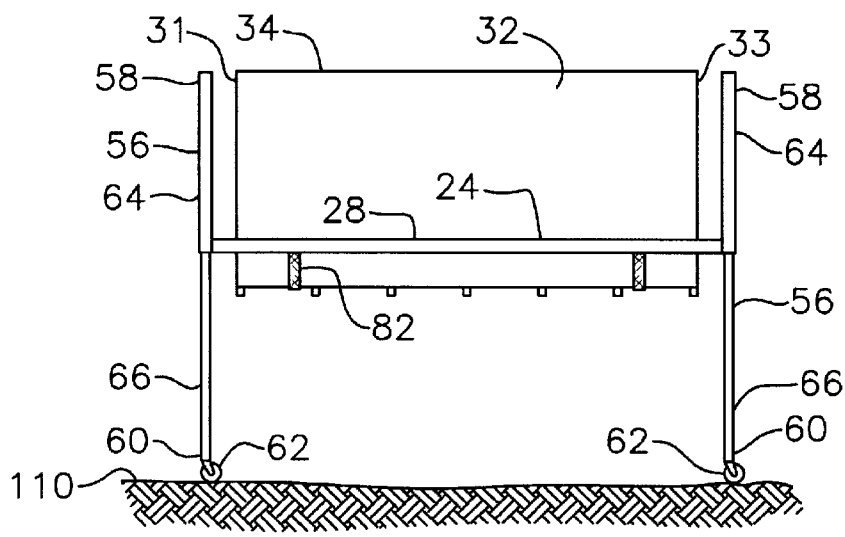
FIG. 6 is a side elevational view of the storage container and carrier frame of FIG. 1, showing the carrier frame and container elevated above the level of the transport vehicle platform.
Figure 7:
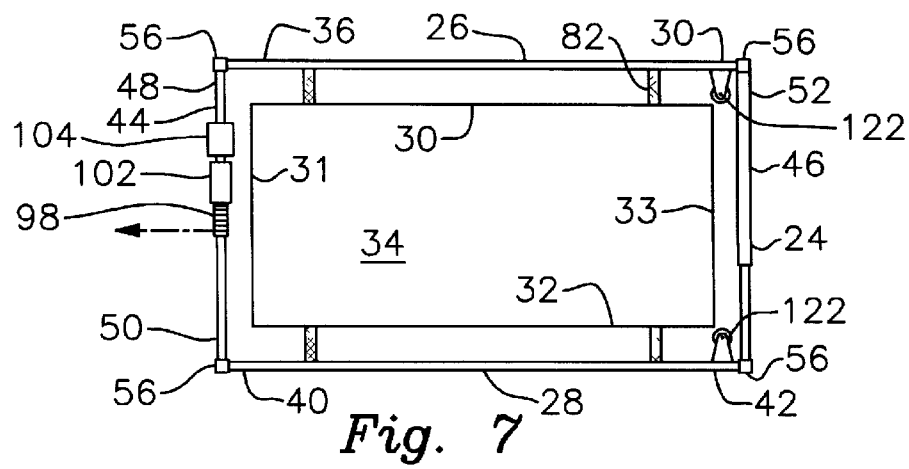
FIG. 7 is a plan view of FIG. 6.
Figure 8:
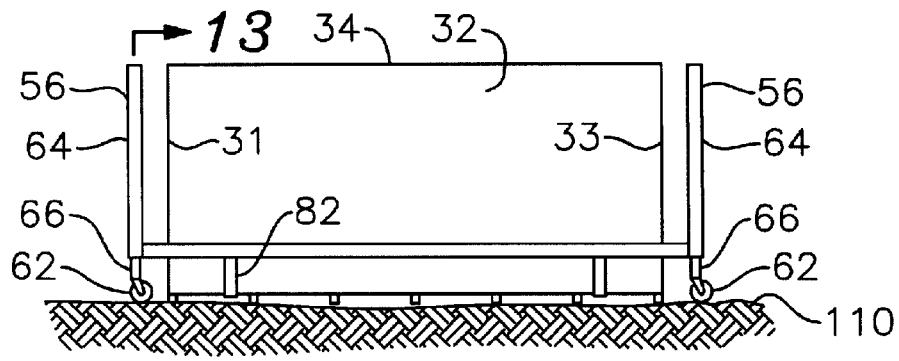
FIG. 8 is a side elevational view of the storage container and carrier frame of FIG. 1, showing the carrier frame and container lowered with the container resting upon the ground.
Figure 9:
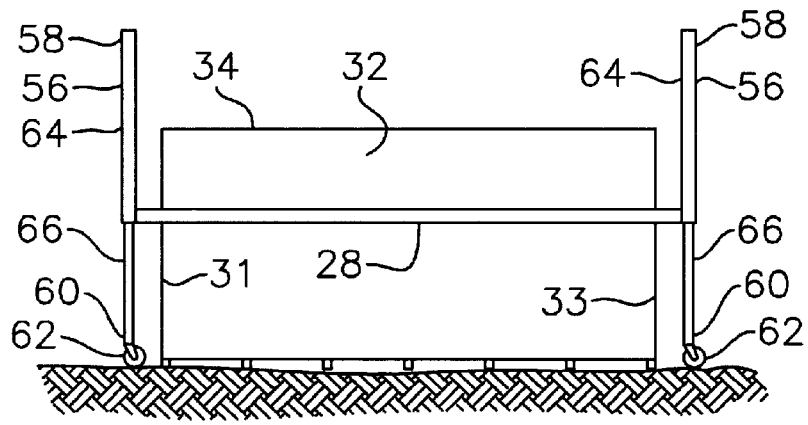
FIG. 9 is a side elevational view of the storage container and carrier frame of FIG. 1, showing the carrier frame elevated above the level of the transport vehicle platform with the container resting upon the ground.
Figure 10:
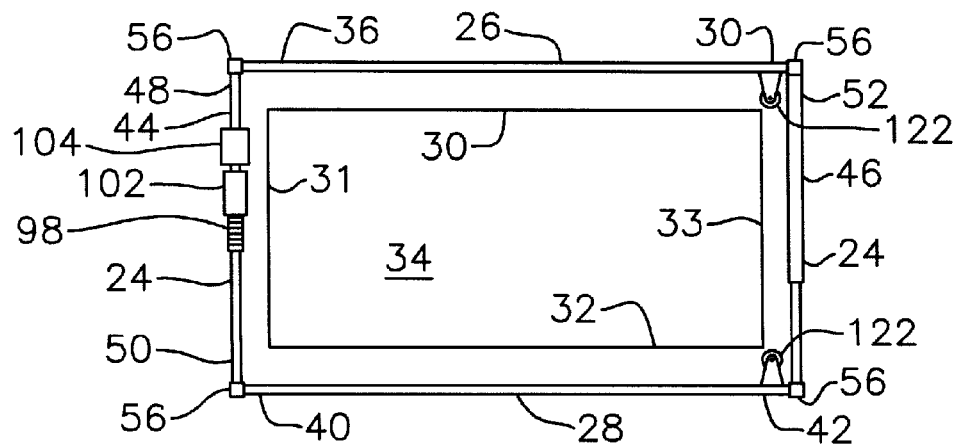
FIG. 10 is a plan view of FIG. 9.
Figure 13:
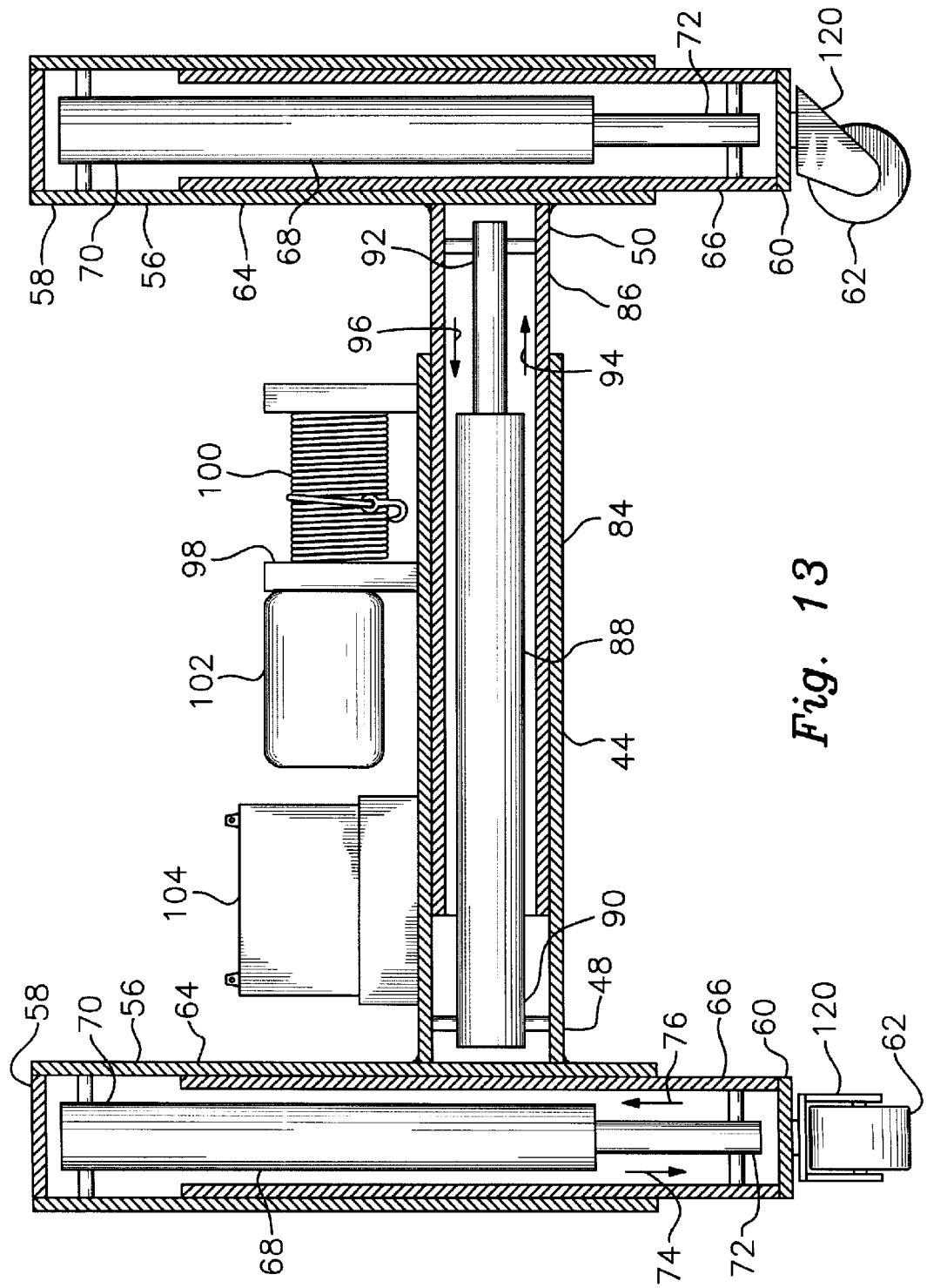
FIG. 13 is a front sectional elevational view of the carrier frame of FIG. 1, showing the carrier frame lowered, the section taken along lines 13—13 of FIG. 8.

Although the use of steering and mobility means 120 as depicted in FIG. 15 is a preferred embodiment, a winch 98 and cable 100 can alternatively or in conjunction with the mobility and steering means 120 be connected to the carrier frame 24, for moving and positioning the carrier frame 24 with respect to the container 34, and for moving and positioning the carrier frame 24 and container 34 together with respect to the vehicle 78. In this embodiment, the winch 98 is typically mounted on the front transverse element 44, as shown in FIG. 13. The winch 98 is typically operated by an electric motor 102, which is powered by a storage battery 104. The electrical connections for these parts are not shown in the drawing, but are known to anyone skilled in the art.

Supporting means 82 are connected to the carrier frame 24 and to the container 34 for supporting the container 34 by the carrier frame 24. Typically, the supporting means will be four chains 82 each affixed on one end to the carrier frame 24. A hook is located on the other end of each chain 82 for engaging an eye (not shown) on the container 34.

The carrier frame 24 includes a pair of guide wheels 122, each wheel being mounted for rotation on a generally vertical axis on an upright member 56 adjacent the rear transverse element 46, with the guide wheels 122 facing inward toward the container 34. As the carrier frame 24 is being moved into position around the container 34, the guide wheels 122 roll against the container 34 to reduce friction therewith, and thus facilitate positioning the carrier frame 24 with the container 34.

The front 44 and rear 46 transverse elements are selectively adjustable in length, so as to allow expansion of the carrier frame 24 to clear the vehicle 78 and the container 34 for positioning, and contraction of the carrier frame 24 into close juxtaposition with the vehicle 78 and the container 34 for transport.

The front transverse element 44 further comprises a tubular fixed element 84, and a tubular sliding element 86 mounted for sliding movement within the fixed element 84. An actuator 88 is mounted within the front transverse element 44. The actuator 88 has opposite first 90 and second 92 ends, the first end 90 being attached to the fixed element 84, and the second end 92 being attached to the sliding element 86. Thus, upon being actuated in an extending direction as shown by arrow 94 in FIG. 13, the actuator 88 will slideably extend the sliding element 86 from within the fixed element 84 in a telescoping manner, so as to expand the carrier frame 24. Conversely, upon being actuated in a retracting direction as shown by arrow 96 in FIG. 13, the actuator 88 will slideably retract the sliding element 86 into the fixed element 84 in a telescoping manner, so as to contract the carrier frame 24.

All of the actuators, in the upright elements and in the front and rear transverse elements, are typically hydraulic cylinder type actuators. The actuators are actuated by gasoline engine driven hydraulic pumps 112 mounted on the carrier frame. The hoses, valves, etc., are not shown in the drawing, but are well known, and can be adapted by anyone skilled in the art. Alternatively, the actuators may be electric motor driven screw type actuators.

Figure 16:
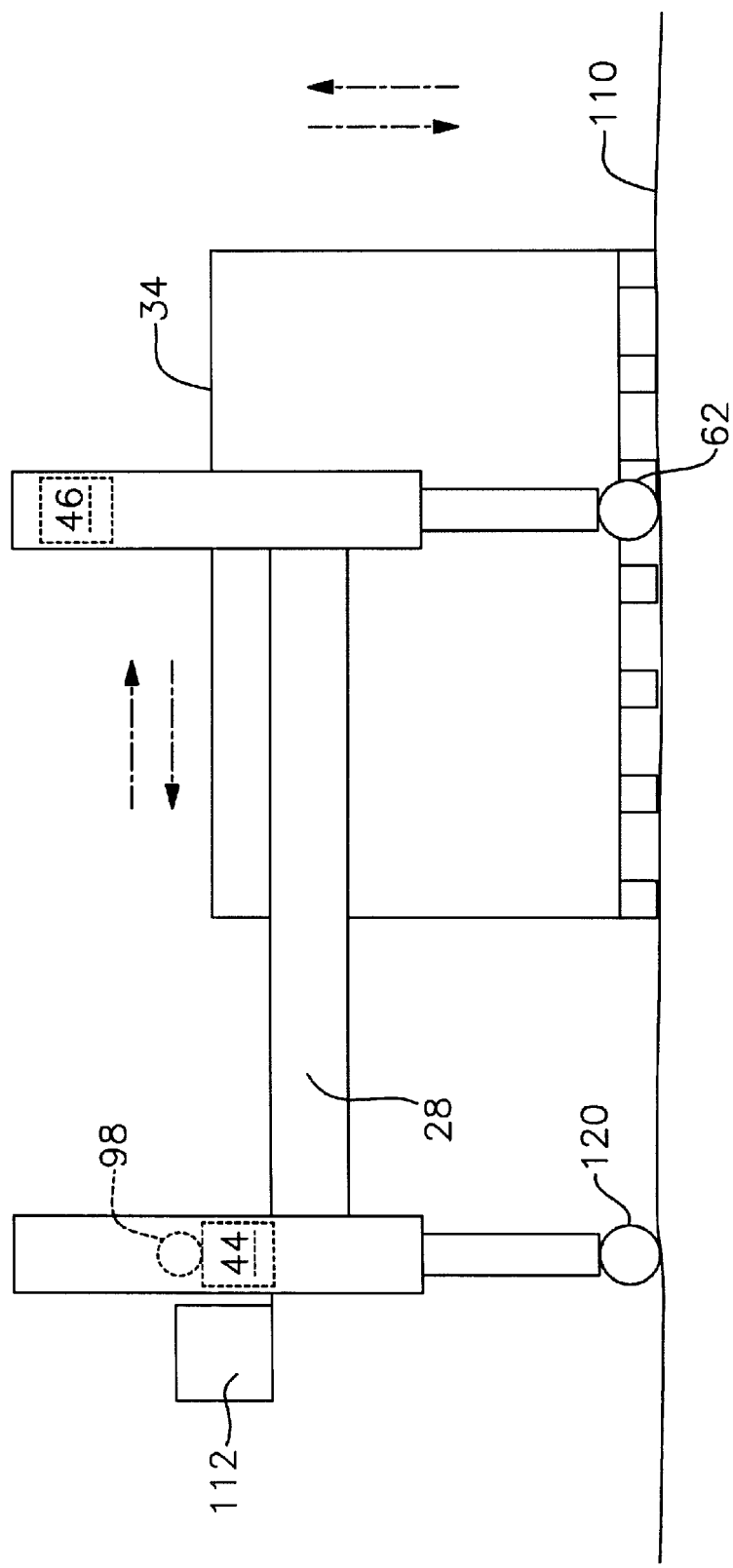
FIG. 16 is a side elevational view of the carrier frame of FIG. 1 passing over the container.

As shown on FIGS. 14–16. steering and mobility means 120 are included with the front upright members lower ends 60. A preferred embodiment of the steering and mobility means includes swivel connection 116 and a hydraulic motor 114 wherein the drive shaft of the hydraulic motor 114 is connected to wheels 62 with a sprocket gear and chain drive 118. Rear transverse element 46 is shown in a position sufficient to clear the height of container 34 as depicted in FIGS. 14B and 16.

The vehicle platform 80 includes notches 108 on either side to receive and releasably retain the upright members 56 upon contraction of the carrier frame 24 into close juxtaposition with the vehicle 78, thereby locking the carrier frame 24 to the vehicle 78, allowing safe transport.

The method of using the invention will now be briefly described. In order to unload the container 34 upon arrival of the vehicle 78 at a job site, the actuators 68 in the upright members 56 will extend, thereby lowering the wheels 62 to the ground 110, and elevating the carrier frame 24 and container 34 above the vehicle 78. The front 44 and rear 46 transverse element actuators will be extended, thus expanding the carrier frame 24 outward from the locking notches 108. The vehicle 78 will then be driven out from under the carrier frame 24 and container 34, and the actuators 68 will lower the carrier frame 24 and container 34 until the container 34 rests upon the ground 110. The supporting chains 82 will be disconnected from the container 34, and the actuators 68 will elevate the carrier frame 24 to a height greater than that of the platform 80. The winch 98 and cable 100 will be connected between the carrier frame 24 and the vehicle 78. The winch 98 and cable 100 will move and position the carrier frame 24 over the vehicle 78. In the preferred embodiment, the carrier frame 24 will be moved over the vehicle 78 using the steering and mobility means 120. The front 44 and rear 45 transverse element actuators will be retracted. The actuators 68 will retract and lower the carrier frame 24 onto the vehicle 78, and continue retracting so as to raise the wheels 62 off the ground 110, thus contracting the carrier frame 24 into the locking notches 108.

In order to load the container 34 onto the vehicle 78, the actuators 68 in the upright members 56 will extend, thereby lowering the wheels 62 to the ground 110, and elevating the carrier frame 24 above the vehicle platform 80. The winch 98 and cable 100 will be connected between the carrier frame 24 and the container 34. The winch 98 and cable 100 will move and position the carrier frame 24 into juxtaposition with the container 34. In the preferred embodiment, the carrier frame 24 will be moved and positioned into juxtaposition with the container 34 by the steering and mobility means 120. The actuators 68 will then lower the carrier frame 24 adjacent to the ground 110, and the supporting chains 82 will be connected to the container 34. The actuators 68 will elevate the carrier frame 24 and container 34 to a height greater than the vehicle platform 80. The winch 98 and cable 100 will be connected between the carrier frame 24 and the vehicle 78. The winch 98 and cable 100 will move and position the carrier frame 24 and container 34 over the vehicle platform 80. In the preferred embodiment, the carrier frame 24 and container 34 will be moved and positioned over the vehicle platform 80 by the steering and mobility means 120. The actuators 68 will retract and lower the carrier frame 24 and container 34 onto the vehicle platform 80, and continue retracting so as to raise the wheels 62 off the ground 110, thereby loading the container 34. Front transverse element 44 and rear transverse element 46 are retracted, locking carrier frame 24 into notches 108. Vertical uprights 56 fit into notches 108 for securing carrier frame 24 to platform 80.

It is to be understood that the above detailed description of embodiments of the invention is provided by way of example only. Various details of design and construction may be modified without departing from the true spirit and scope of the invention as set forth in the appended claims.

Now that the invention has been described,

What is claimed is:

1. An apparatus for lifting, handling and transporting a container having right and left sides and front and rear ends, the apparatus comprising:

a carrier frame including right and left longitudinal elements juxtaposed with the right and left sides, respectively, of the container to be handled and transported, each longitudinal element extending between opposite first and second ends, the carrier frame having front and rear transverse elements juxtaposed with the front and rear ends, respectively, of the container to be handled and transported, each transverse element extending between opposite right and left ends, the left ends of the front and rear elements being adjacent to the first and second ends, respectively, of the left longitudinal element, and the right ends of the front and rear elements being adjacent to the first and second ends, respectively, of the right longitudinal element, the carrier frame further including a plurality of generally vertical upright members, each upright member extending between opposite upper and lower ends;

bearing means attached to each upright member lower end, for ground bearing and relative movement of the upright members with the ground;

elevating means for elevating and lowering the carrier frame with respect to the ground;

positioning means connected to the carrier frame for moving and positioning the carrier frame with respect to the container, and for moving and positioning the carrier frame and container together with respect to a transport vehicle having a platform when the container is to be loaded on to and off from said transport vehicle;

supporting means connected to the carrier frame and to the container for supporting the container to the frame; and means for providing hydraulic power to actuators, wherein the carrier frame is capable of being elevated to be moved over the container and is capable of being lowered around the container for attaching the carrier frame to the container for subsequent lifting, handling and transporting of the container.

2. The apparatus of claim 1 wherein the upright members each further comprise a tubular fixed element attached to the carrier frame and a tubular sliding element mounted for sliding movement within the fixed element.

3. The apparatus of claim 2 wherein the elevating means further comprises a plurality of actuators, each actuator mounted within an upright member, each actuator having opposite first and second ends, the first end being attached to the tubular fixed element of the upright member, the second end being attached to the upright member tubular sliding element, so that upon being actuated in an extending direction, the actuators will slideably extend the sliding element from within the fixed element in a telescoping manner to elevate the carrier frame, and upon being actuated in a retracting direction, the actuators will slideably retract the sliding element into the fixed element in a telescoping manner to lower the carrier frame.

4. The apparatus of claim 1 wherein the carrier frame includes a pair of guide wheels, each guide wheel mounted for rotation on a generally vertical axis on an upright member adjacent the rear transverse element, with the guide wheels facing inward toward the container for engagement with the container to facilitate positioning the carrier frame with the container.

5. The apparatus of claim 1 wherein the front and rear transverse elements are selectively adjustable in length to allow expansion of the carrier frame to clear the transport vehicle and the container for positioning and contraction of the carrier frame into close juxtaposition with the transport vehicle and the container.

6. The apparatus of claim 5, wherein each front and rear transverse elements further comprise:

a tubular fixed element;

a tubular sliding element mounted for sliding movement within the fixed element;

an actuator mounted within each front and rear transverse elements, the actuator having opposite first and second ends, the first end being attached to the fixed element, the second end being attached to the sliding element, so that upon being actuated in an expanding direction, the actuator will slideably extend the sliding element from within the fixed element in a telescoping manner to expand the carrier frame, and upon being actuated in a contracting direction, the actuator will slideably retract the sliding element into the fixed element in a telescoping manner to contract the carrier frame; and wherein the actuators mounted within each front and rear end transverse elements are hydraulic cylinder type actuators.

7. The apparatus of claim 6 wherein the actuators mounted within each front and transverse elements are electric motor driven screw type actuators.

8. The apparatus of claim 1 wherein the transport vehicle platform includes notches on either side to receive and releasably retain the upright members upon contraction of the carrier frame into close juxtaposition with the vehicle for locking engagement of the carrier frame to the transport vehicle platform.

9. The apparatus of claim 1 wherein the supporting means include a plurality of chains, each chain being fixed on one end to the carrier frame and the other end of the chain in releasable engagement with the container.

10. The apparatus of claim 1 wherein the means for providing hydraulic power to actuators is a gasoline engine driven hydraulic pump.

11. The apparatus of claim 1 wherein the container and the carrier frame may be transported simultaneously on the platform of the transport vehicle.

12. The apparatus of claim 11 wherein the vehicle platform includes notches on either side to receive and releasably retain the upright members upon contraction of the carrier frame into close juxtaposition with the vehicle for locking engagement of the carrier frame to the vehicle platform.

13. The apparatus of claim 1, wherein the bearing means are wheels.

14. The apparatus of claim 13, further comprising steering and mobility means at the upright member lower ends at the rear of the carrier frame.

15. The apparatus of claim 14, wherein the steering and mobility means and wheels attached to the upright member lower ends at the rear of the carrier frame further comprise:

a swivel connection between the wheel and the corresponding lower end of the upright member;

a hydraulic motor with a drive shaft for mounting a sprocket gear; and a corresponding sprocket gear attached to the wheel for connecting a sprocket chain between the hydraulic motor drive shaft and the wheel.

16. An apparatus for lifting, handling and transporting a container having right and left sides and front and rear ends, the apparatus comprising:

a carrier frame including right and left longitudinal elements juxtaposed with the right and left sides, respectively, of the container to be handled and transported, each longitudinal element extending between opposite first and second ends, the carrier frame having front and rear transverse elements juxtaposed with the front and rear ends, respectively, of the container to be handled and transported, each transverse element extending between opposite right and left ends, the left ends of the front and rear elements being adjacent to the first and second ends, respectively, of the left longitudinal element, and the right ends of the front and rear elements being adjacent to the first and second ends, respectively, of the right longitudinal element, the carrier frame further including four generally vertical upright members, each upright member extending between opposite upper and lower ends;

wheels, attached to each upright member lower end, for ground bearing and relative movement of the upright members with the ground;

elevating means for elevating and lowering the frame with respect to the ground;

a winch and cable connected to the carrier frame for moving and positioning the carrier frame with respect to the container, and for moving and positioning the carrier frame and container together with respect to the transport vehicle having a platform when the container is to be loaded on to and off from said transport vehicle;

supporting means connected to the frame and to the container for supporting the container by the frame; and means for providing hydraulic power to actuators, wherein the carrier frame is capable of being elevated to be moved over the container and is capable of being lowered around the container for attaching the carrier frame to the container for subsequent lifting, handling and transporting of the container.

17. The apparatus of claim 16 wherein the upright members each further comprise a tubular fixed element attached to the carrier frame and a tubular sliding element mounted for sliding movement within the fixed element.

18. The apparatus of claim 17, wherein the elevating means further comprises a plurality of actuators, each actuator mounted within an upright member, each actuator having opposite first and second ends, the first end being attached to the tubular fixed element of the upright member, the second end being attached to the upright member tubular sliding element, so that upon being actuated in an extending direction, the actuators will slideably extend the sliding element from within the fixed element in a telescoping manner to elevate the carrier frame, and upon being actuated in a retracting direction, the actuators will slideably retract the sliding element into the fixed element in a telescoping manner to lower the carrier frame.

19. The apparatus of claim 16, wherein the carrier frame includes a pair of guide wheels, each guide wheel mounted for rotation on a generally vertical axis on an upright member adjacent the rear transverse element, with the guide wheels facing inward toward the container for engagement with the container to facilitate positioning the carrier frame with the container.

20. The apparatus of claim 16 wherein the front and rear transverse elements are selectively adjustable in length, so as to allow expansion of the carrier frame to clear the transport vehicle and the container for positioning, and contraction of the carrier frame into close juxtaposition with the transport vehicle and the container.

21. The apparatus of claim 20, wherein the front and rear transverse elements further comprise:

a tubular fixed element;

a tubular sliding element mounted for sliding movement within the fixed element;

an actuator mounted within each front and rear transverse element, the actuator having opposite first and second ends, the first end being attached to the fixed element, the second end being attached to the sliding element, so that upon being actuated in an extending direction, the actuator will slideably extend the sliding element from within the fixed element in a telescoping manner to expand the carrier frame, and upon being actuated in a retracting direction, the actuator will slideably retract the sliding element into the fixed element in a telescoping manner to contract the carrier frame; and wherein the actuators mounted within each front and rear transverse elements are hydraulic cylinder type actuators.

22. The apparatus of claim 16 wherein the transport vehicle platform includes notches on either side to receive and releasably retain the upright members upon contraction of the carrier frame into close juxtaposition with the transport vehicle, for locking engagement of the carrier frame to the transport vehicle platform.

23. The apparatus of claim 22 wherein the actuators are electric motor driven screw type actuators.

24. The apparatus of claim 16 wherein the supporting means includes a plurality of chains, each chain being fixed on one end to the carrier frame and the other end of the chain in releasable engagement with the container.

25. The apparatus of claim 16, wherein the wheel attached to the upright member lower ends at the rear of the carrier frame further comprise:

a swivel connection between the wheel and the corresponding lower end of the upright member;

a hydraulic motor with a drive shaft for mounting a sprocket gear; and a corresponding sprocket gear attached to the wheel for connecting a sprocket chain between the hydraulic motor drive shaft and the wheel.

26. The apparatus of claim 16 wherein the means for providing hydraulic power to actuators is a gasoline engine driven hydraulic pump.

27. The apparatus of claim 16 wherein the container and the carrier frame may be transported simultaneously on the platform of the transport vehicle.

28. The apparatus of claim 27 wherein the vehicle platform includes notches on either side to receive and releasably retain the upright members upon contraction of the carrier frame into close juxtaposition with the vehicle for locking engagement of the carrier frame to the vehicle platform.

29. A method of lifting, handling and transporting a container on to and off from a transport vehicle having a cargo carrying platform, the method comprising the steps of:

positioning a carrier frame around the container on the transport vehicle platform;

releasably attaching the carrier frame to the container;

extending rear and front upright members downward into a ground-engaging position;

elevating the carrier frame with hydraulic means and container above the transport vehicle platform;

expanding the carrier frame with hydraulic means to clear the sides of the transport vehicle platform;

driving the transport vehicle out from under the carrier frame and container;

lowering the carrier frame and container until the container rests upon the ground;

releasing the carrier frame attachment from the container;

activating a steering and mobility means for providing driving power and directional control to wheels at the lower end of the rear upright members;

directing the movement of the carrier frame away from the container;

elevating the carrier frame to an elevation higher than that of the transport vehicle platform;

moving and positioning the carrier frame over the transport vehicle platform;

deactivating the steering and mobility means;

retracting the carrier frame with hydraulic means to align the upright members in close proximity to the transport vehicle platform;

lowering the carrier frame to rest upon the transport vehicle platform;

retracting the upright members upward away from the ground-engaging position so that the transport vehicle is able to transport the carrier frame;

extending the upright members downward into a ground-engaging position;

elevating the carrier frame with hydraulic means above the transport vehicle platform;

expanding the carrier frame with hydraulic means to clear the sides of the transport vehicle platform;

activating a steering and mobility means for providing driving power and directional control to wheels at the lower end of the rear upright members;

directing the movement of the carrier frame away from the transport vehicle platform;

moving and positioning the carrier frame around the container;

lowering the carrier frame adjacent to the ground;

releasably attaching the carrier frame to the container;

elevating the carrier frame and container to an elevation higher than that of the transport vehicle platform;

moving and positioning the carrier frame and container over the transport vehicle platform;

deactivating the steering and mobility means;

retracting the carrier frame with hydraulic means to align the upright members in close proximity to the transport vehicle platform;

lowering the carrier frame and container to rest upon the transport vehicle platform; and retracting the upright members upward away from the ground-engaging position so that the transport vehicle is able to transport the carrier frame and container.

30. The method of claim 29 further comprising the step of providing notches on either side of the transport vehicle platform for receiving and releasably retaining the upright members upon contraction of the carrier frame into close juxtaposition with the transport vehicle.

31. The method of claim 29, further comprising the steps of:

mounting guide wheels on both sides of the carrier frame for engagement with the container; and guiding the carrier frame into position around the container with the guide wheels.

32. An apparatus for lifting, handling and transporting a container having right and left sides and front and rear ends, the apparatus comprising:

a carrier frame including right and left longitudinal elements juxtaposed with the right and left sides, respectively, of the container to be handled and transported, each longitudinal element extending between opposite first and second ends, the carrier frame having front and rear transverse elements juxtaposed with the front and rear ends, respectively, of the container to be handled and transported, each transverse element extending between opposite right and left ends, the left ends of the front and rear elements being adjacent to the first and second ends, respectively, of the left longitudinal element, and the right ends of the front and rear elements being adjacent to the first and second ends, respectively, of the right longitudinal element, the carrier frame further including a plurality of generally vertical upright members, each upright member extending between opposite upper and lower ends;

the front and rear transverse elements being selectively adjustable in length to allow expansion of the carrier frame to clear a transport vehicle and the container for positioning and contraction of the carrier frame into close juxtaposition with the transport vehicle and the container;

bearing means attached to each upright member lower end, for ground bearing and relative movement of the upright members with the ground;

elevating means for elevating and lowering the carrier frame with respect to the ground;

positioning means connected to the carrier frame for moving and positioning the carrier frame with respect to the container, and for moving and positioning the carrier frame and container together with respect to the transport vehicle having a platform when the container is to be loaded on to and off from said transport vehicle;

supporting means connected to the carrier frame and to the container for supporting the container to the frame; and means for providing hydraulic power to actuators, wherein the carrier frame is capable of being elevated to be moved over the container and is capable of being lowered around the container for attaching the carrier frame to the container for subsequent lifting, handling and transporting of the container.

33. The apparatus of claim 32 wherein the upright members each further comprise a tubular fixed element attached to the carrier frame and a tubular sliding element mounted for sliding movement within the fixed element.

34. The apparatus of claim 33 wherein the elevating means further comprises a plurality of actuators, each actuator mounted within an upright member, each actuator having opposite first and second ends, the first end being attached to the tubular fixed element of the upright member, the second end being attached to the upright member tubular sliding element, so that upon being actuated in an extending direction, the actuators will slideably extend the sliding element from within the fixed element in a telescoping manner to elevate the carrier frame, and upon being actuated in a retracting direction, the actuators will slideably retract the sliding element into the fixed element in a telescoping manner to lower the carrier frame.

35. The apparatus of claim 32 wherein the carrier frame includes a pair of guide wheels, each guide wheel mounted for rotation on a generally vertical axis on an upright member adjacent the rear transverse element, with the guide wheels facing inward toward the container for engagement with the container to facilitate positioning the carrier frame with the container.

36. The apparatus of claim 32 wherein the transport vehicle platform includes notches on either side to receive and releasably retain the upright members upon contraction of the carrier frame into close juxtaposition with the vehicle for locking engagement of the carrier frame to the transport vehicle platform.

37. The apparatus of claim 32, wherein each front and rear transverse elements further comprise:
   a tubular fixed element;
   a tubular sliding element mounted for sliding movement within the fixed element;
   an actuator mounted within each front and rear transverse elements, the actuator having opposite first and second ends, the first end being attached to the fixed element, the second end being attached to the sliding element, so that upon being actuated in an expanding direction, the actuator will slideably extend the sliding element from within the fixed element in a telescoping manner to expand the carrier frame, and upon being actuated in a contracting direction, the actuator will slideably retract the sliding element into the fixed element in a telescoping manner to contract the carrier frame; and
   wherein the actuators mounted within each front and rear end transverse elements are hydraulic cylinder type actuators.

38. The apparatus of claim 37 wherein the actuators mounted within each front and transverse elements are electric motor driven screw type actuators.

39. The apparatus of claim 32 wherein the supporting means include a plurality of chains, each chain being fixed on one end to the carrier frame and the other end of the chain in releasable engagement with the container.

\* \* \* \* \*